Jan. 28, 1969  L. ROMANZI, JR., ET AL  3,425,034
VEHICLE SIGNAL LAMP SYSTEM
Filed Oct. 20, 1965  Sheet 1 of 3
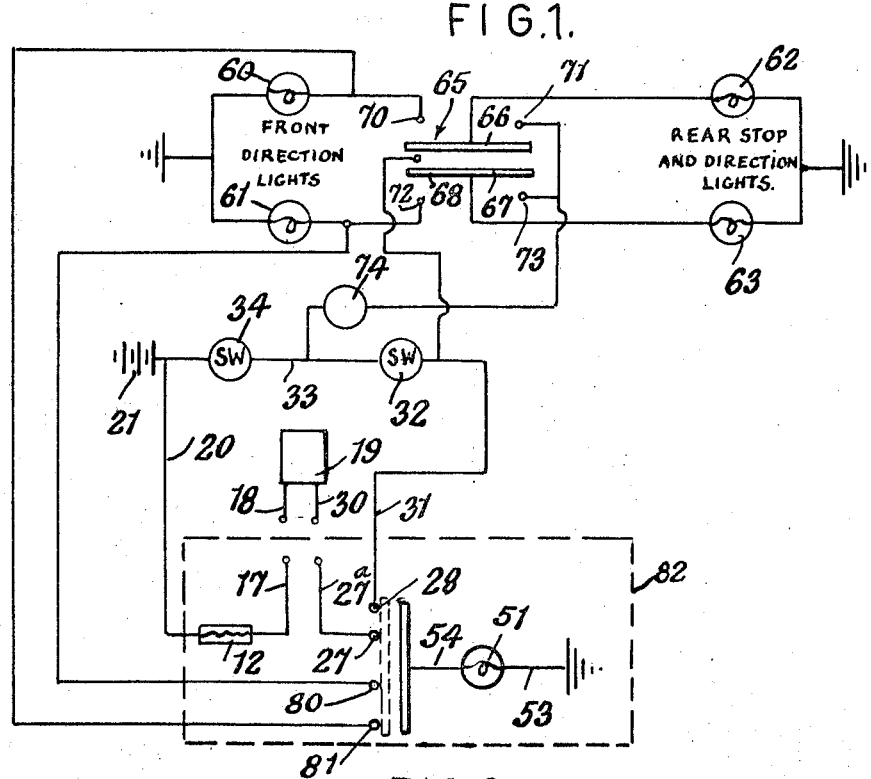
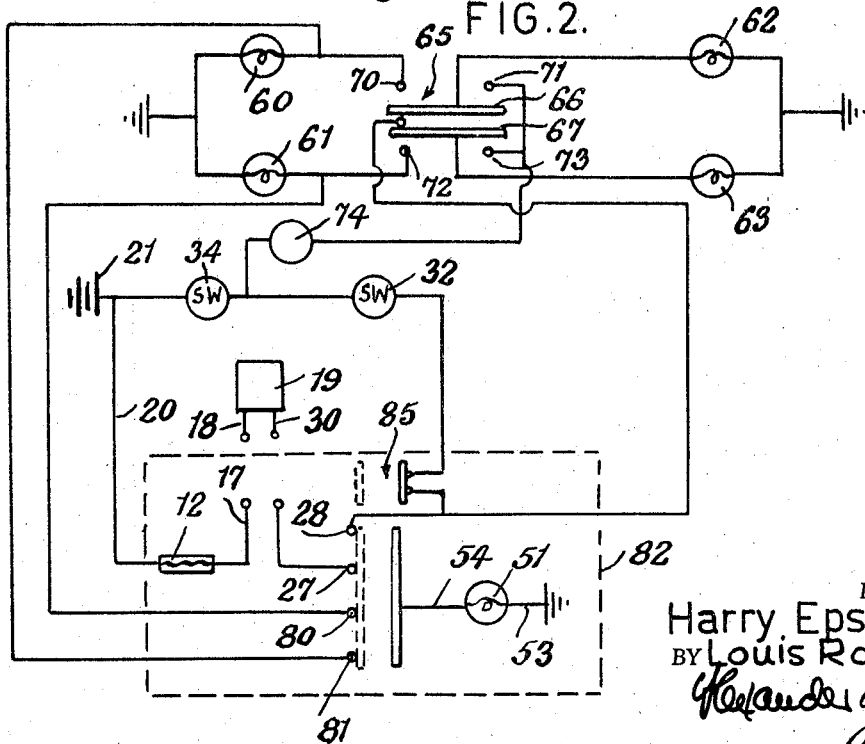
INVENTORS
Harry Epstein &
BY Louis Romanzi, Jr.
Attorney

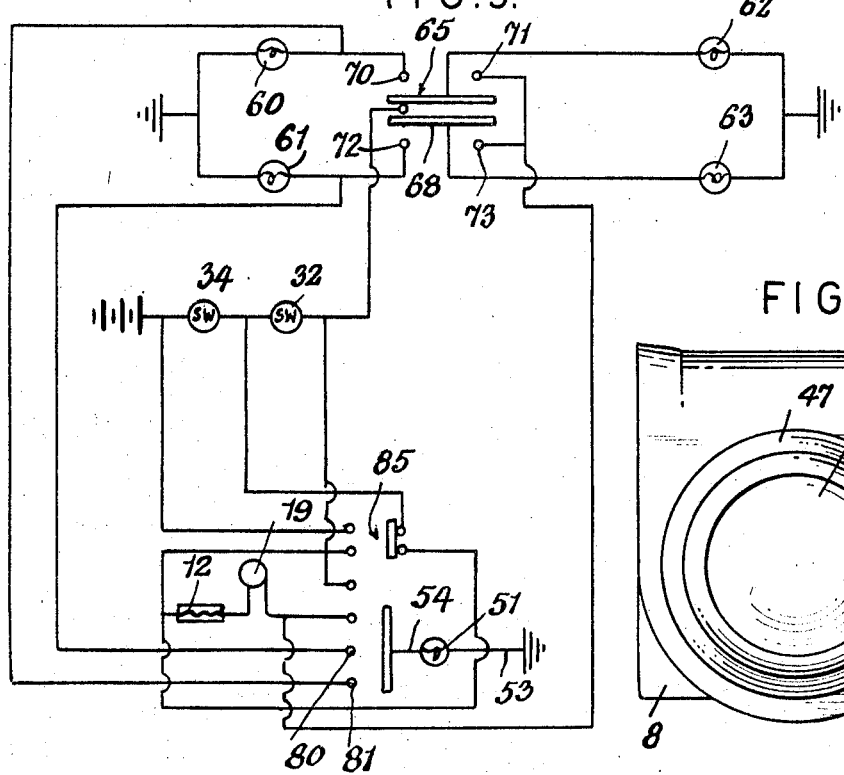
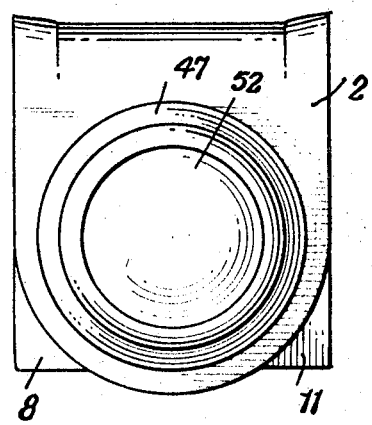
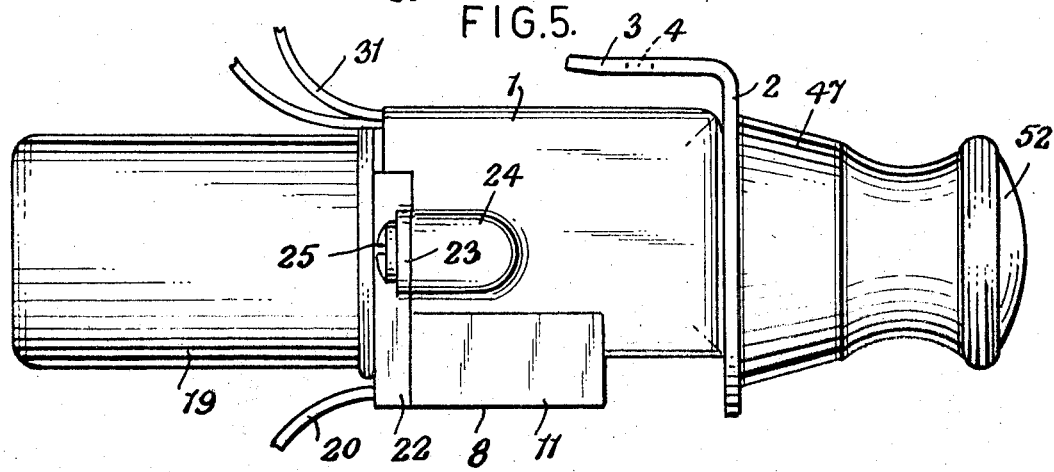

Jan. 28, 1969  L. ROMANZI, JR., ET AL  3,425,034
VEHICLE SIGNAL LAMP SYSTEM
Filed Oct. 20, 1965  Sheet 3 of 3
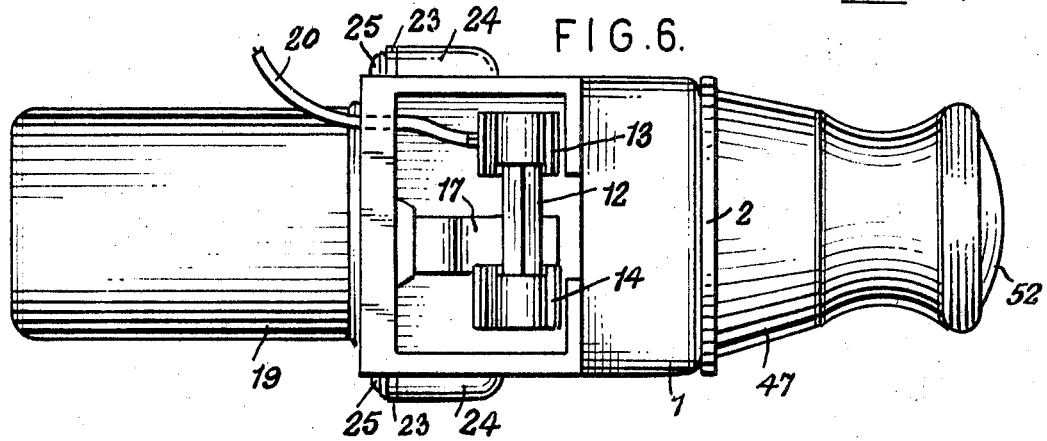
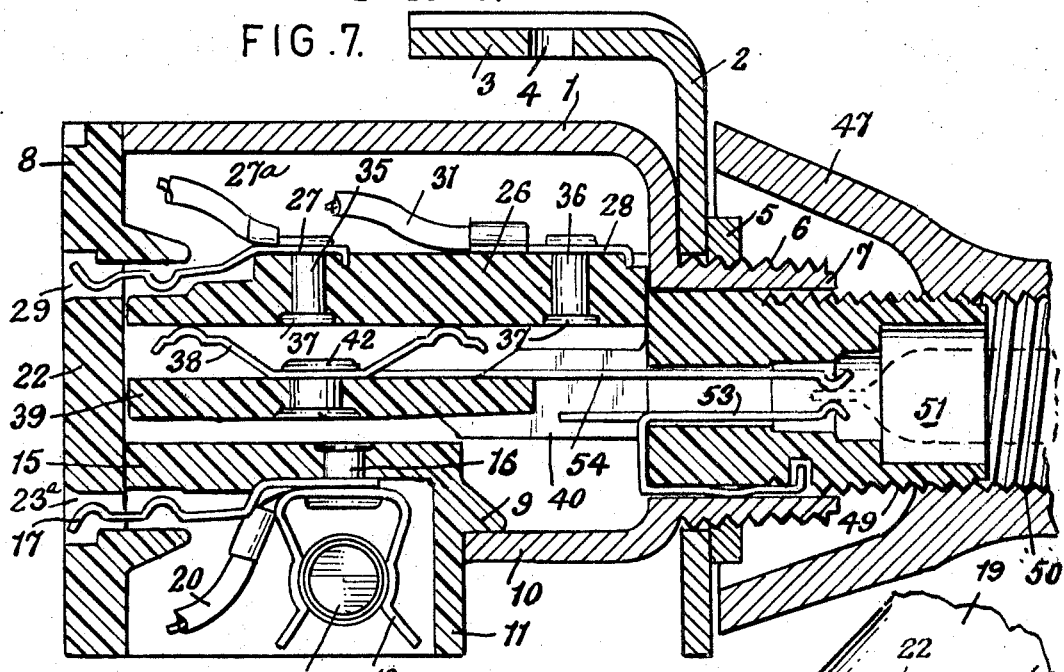
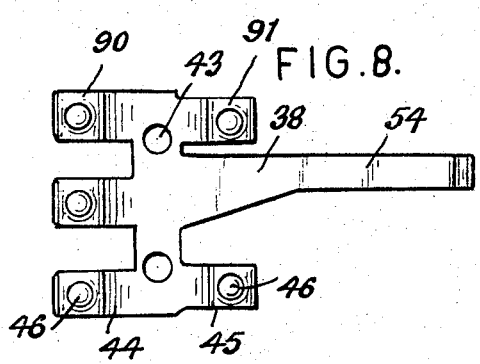
INVENTORS
Harry Epstein &
BY Louis Romanzi Jr.
Attorney

United States Patent Office 3,425,034
Patented Jan. 28, 1969

3,425,034
VEHICLE SIGNAL LAMP SYSTEM
Louis Romanzi, Jr., 14954 Lauder, Detroit, Mich. 48227, and Harry Epstein, 21 Dannaway, Saddle Brook, N.J. 07662
Filed Oct. 20, 1965, Ser. No. 498,690
U.S. Cl. 340—81     1 Claim
Int. Cl. B60q 1/46

ABSTRACT OF THE DISCLOSURE

The invention consists of a switch and flasher unit for attachment to an automobile and connection to the electrical systems to operate the rear stop and front and rear direction lights as a warning as when the automobile is at the side of the road or elsewhere and especially in the case of its being disabled. Said unit consists of a casing containing a switch, socket means on the casing for receiving a plug-in type of flasher, an insulated enclosure on the casing for receiving a fuse, a movable knob on the outside of the casing for operating the switch, and a light visible through the knob for indicating operation of the warning signal.

---

This invention relates to signal devices for automobiles, and more particularly to means adapted for installation in the electrical systems thereof by which a flashing or intermittent illumination of light on the car can be had to indicate, for example, the location of the car at the side of the road or elsewhere, and especially in the case of a disabled car.

An arrangement of this kind is disclosed in U.S. 3,165,716, dated Jan. 12, 1965, and the present invention relates to improvements thereover.

In known construction such as is disclosed in the above-identified patent, the various components of the device such as the switch, fuse with supporting bracket therefor, a flasher socket and an indicator light socket are separated elements, and the mounting of such elements constitutes a serious installation problem.

It is therefore one of the objects of the present invention to provide a unitary mounting means for the various elements of the device whereby said switch, fuse, flasher and socket therefor, and an indicating light are combined into a single, easily mounted unit.

It is another object of the invention to provide simplified circuitry for the device, thereby minimizing the number of electrical connections required for the installation; to provide means for making the brake switch inoperative when the warning signal is in operation, and in another case using only one flasher for both the warning signal and the turn signal systems.

These objects and other incidental ends and advantages of the invention will hereinafter appear in the progress of the disclosure and as pointed out in the appended claim.

The accompanying drawings show illustrative embodiments of the invention wherein:

FIGS. 1, 2 and 3 respectively are electric circuit diagrams utilized for embodiment of the signal or flashing device in the electrical circuit of the vehicle to which it is applied;

FIG. 4 is an end elevational view of the unitary assembly for the various components of the device;

FIG. 5 is a side elevational view of the said assembly or unit;

FIG. 6 is a view of the same as seen from below;

FIG. 7 is a longitudinal sectional view through the unit;

FIG. 8 is a top plan view of one of the contact strips embodied in the switch, and FIG. 9 is a perspective view of the insulated section of the casing or housing showing the flasher in position thereon.

The mounting assembly unit for the switch and flasher includes a two-part housing or casing, the main portion or body thereof 1 being formed preferably of metal both for strength and to constitute a ground for the indicator light. The unit is suitably mountable on the instrument panel of the vehicle or at any other convenient position by suitable means thereon and as specifically shown is by means of an L-shaped mounting bracket 2 having a leg 3 provided with openings or holes, one of which is shown at 4 and through which screws or other fastening elements may be extended to fasten or mount the unit in place on the vehicle.

The mounting bracket 2 is secured to the casing section 1 by means of a nut 5 which engages screw threads 6 provided on a boss 7, the latter as shown being formed integrally with the casing section 1 and extends through an aperture formed in the bracket 2 as clearly shown in FIG. 7.

The second part 8 of the casing is composed of insulating material and is preferably of a suitable plastic such as Teflon, said casing part being more clearly shown in FIG. 9. Said part 8 has an interfit with the metal casing section 1 and has a bead 9 at its forward end which overlies the bottom wall 10 of the casing section 1 as seen in FIG. 7. The lower portion of the casing section 8 is formed with a rectangular walled frame 11 which is open at the bottom and has its side wall extending around and protecting a cartridge fuse 12 held in clips 13 and 14, said clips being attached to the top wall 15 of the enclosure or frame 11 by means of rivets 16 (omitted in FIG. 9, but having one of them disclosed in FIG. 7). A contact strip 17 is connected to one of the clips as that shown at 14, said contact strip establishing electrical contact with a prong or blade 18 extending from a flasher 19 of the known plug-in type. The second fuse clip as that shown at 13 is connected as at 20 (FIG. 1) to the battery 21 of the vehicle. One of the walls of the enclosure 11 may be notched as shown at 11a in FIG. 9 to facilitate the insertion or removal of the fuse 12 when required.

The insulated casing section 8 has a vertical or upstanding rear wall 22 apertured at 23a to permit entry of one of the prongs of the flasher to contact the strip 17. Said rear wall 22 is provided with laterally projecting ears 23 which align with lugs 24 formed on the opposite side walls of the section 1 of the casing. Screws 25 passing through the ears 23 and entering the lugs 24 are utilized to serve to hold the two sections 1 and 8 of the casing together.

Fixedly mounted in the casing section 1 is a shelf or platform 26 (FIG. 7) of insulating material, said shelf or platform acting as a support for a pair of contact strips indicated respectively at 27 and 28 in FIG. 7.

Contact strip 27 has a tongue extending through an aperture 29 in the wall 22 and is positioned to establish electrical contact with a second prong 30 (FIG. 1) projecting from the flasher 19. The prong shown at 30a in FIG. 9 on the flasher is a positioning element and extends through a properly positioned slot in the wall 22. The contact strip 28 is fastened to the platform or shelf 26 as by means of a headed rivet 36 and a similar rivet 35 attaches the contact strip 27 to the shelf (FIG. 7).

The contact strip 28 attaches to a lead wire 31 which connects to the conventional stop switch 32 that connects to the vehicle ignition switch 34 connected to the battery 21 as shown in FIG. 1.

Each of the rivets 35 and 36 at the lower end and below the shelf is provided with an exposed head 37, such heads constituting contact buttons by which the contact strips 27 and 28 can be bridged by means of fingers provided on a movable contact member 38 clearly shown in FIG. 8.

The contact member 38 is attached to a flat plate portion 39 forming a part of an axially slidable plunger 40 which has a plug portion 41 slidable through the boss 7. Fastening means such as rivets 42 passing through openings or holes 43 formed in the contact member 38 serve to fasten the contact member to the plate portion 39. The fingers 44 and 45 bring their protuberances 46 into contact with the rivet heads 37, thus bridging the contact strips 27 and 28 as indicated in dotted lines in FIG. 1, this circuit-closing effect being attained by a manual pull toward the right on the knob shown at 47.

The knob 47 is fastened to the plunger 40 by means of screw threads 49 provided on the plunger and which are engaged by the threads 50 provided on the interior of the knob. Knob 47 is hollow and has room in its interior for a lamp bulb 51, and when the lamp is illuminated by closure of the switch, its rays will be directed through a red or other suitably-tinted lens 52 provided in the front end of the knob. This constitutes an indicating means which serves to alert the car operator that the flashing device is in operation. The lamp bulb is inserted between contact strips 53 and 54, the strip 53 being a ground contact which establishes electrical connection to the grounded casing section 1 by contact therewith as clearly seen in FIG. 7. Contact strip 54 is the extended tongue formed on the contact member 38 as clearly seen in FIG. 8. Thus, when the plunger 40 is pulled outwardly or toward the right as from the position in FIG. 5 for example, the contact strips 27 and 28 are resultantly bridged by the contact member 38 and the lamp 51 will be illuminated.

Referring now to FIG. 1, there are generally shown two front signal lamps 60 and 61 of a vehicle, two rear signal lamps at 62 and 63, and the car battery 21. The conventional directional signal includes the switch 65 having two movable contact bars 66 and 67, a common contact point 68 and two pairs of switching contacts 70 and 71 and 72 and 73. An automatic flasher unit 74 is connected between the positive terminal of the battery 21 and the contact points 71 and 73. The ignition switch indicated at 34 is in off position when the car is stationary and the motor not in operation while the brake pedal or "stop" switch is indicated at 32.

The switch included in the unit shown in FIGS. 5 to 9 is normally in off position as indicated in the circuit diagrams. When the knob 47 is pulled out, the contact member 38 closes the circuit between the contacts 27 and 28 and also closes the circuit between contacts 80 and 81 connected into the circuit as shown in FIG. 1. The dotted enclosure line 82 shown in the circuit diagrams represents the unit FIGS. 4 to 9. The fingers 90 and 91 on the contact member 38 close the circuit between the contacts 80 and 81.

The circuit diagram shown in FIG. 1 is in the main substantially similar to that shown in U.S. 3,165,716 and the device operates similarly thereto but is structured to afford more convenience in both mounting and utility. In addition, only three connections rather than four are used since one connection through lead 31 extends directly to the brake switch line. When knob 47 is drawn out, the light 51 will be illuminated and the front signal lights 60 and 61 as well as the rear lights 62 and 63 will flash on and off in the manner described in said patent.

The circuit shown in FIG. 2 is generally similar to that of FIG. 1, except that the same includes a cut-off switch 85 also contained in the housing or casing 1, 2, and operated by the plunger 40, and which serves to make the brake switch 32 inoperative when the flashing signal is in operation. This prevents the possibility of the flashing being prevented should the brake pedal be depressed while the warning signal is in operation.

The circuit of FIG. 3 is also somewhat similar to that of FIG. 1 except that it is adapted to employ only one flasher instead of two as are employed in the circuits of FIGS. 1 and 2.

It is apparent from the foregoing that the arrangement with respect to structure and with respect to circuitry is provided whereby the warning signal means are readily connectable into the electrical circuit of the car and wherein by a pull on the knob 47 said means will be set in operation as herein described.

It is understood that minor changes and variations in structure, circuitry and adaptation of parts and procedures constituting the invention may all be resorted to without departing from the spirit of the invention and the scope of the appended claim.

We claim:

1. In a vehicle signal system by which lights on a vehicle are flashed as a warning, a housing composed of interfitting front and rear sections, the front section being composed of metal and having a forwardly extending externally threaded boss, an L-shaped mounting bracket clamped to the front section by a nut threadably fitted on the boss, a slide having a plug portion extending through the boss, said plug portion being threaded to receive a hollow knob, a light arranged within the knob, connection elements extending through the plug and engaging the light to cause illumination of the same the slide including a plate carrying a contact member, a shelf mounted within the casing and having spaced connection strips adapted to be bridged by the contact member on movement of the slide, the rear section of the casing having a vertical wall, contact fingers extending through slots in said wall, a flasher having prongs entering said slots and electrically contacting the fingers disposed therein, and the rear section of the casing including an open-bottom walled frame containing clips for holding a cartridge-type fuse.

References Cited

UNITED STATES PATENTS

| | | | |
|---|---|---|---|
| 2,623,935 | 12/1952 | Young | 340—80 XR |
| 2,977,581 | 3/1961 | Rodgers | 340—81 XR |
| 3,185,961 | 5/1965 | Du Rocher | 340—81 |

JOHN W. CALDWELL, *Primary Examiner.*

ALVIN W. WARING, *Assistant Examiner.*

U.S. Cl. X.R.

200—161, 168; 340—74